Patented Nov. 21, 1950

2,531,363

UNITED STATES PATENT OFFICE 2,531,363

MAKING DIALKYL ACETIC ACIDS AND RELATED COMPOUNDS

Earl L. Pelton and Andrew A. Holzschuh, Midland, Mich., assignors to The Dow Chemical Company, Midland, Mich., a corporation of Delaware No Drawing. Application January 3, 1949, Serial No. 69,038

3 Claims. (Cl. 260—540)

This invention relates to a method for the preparation of dialkyl acetic acids, and to certain new compounds produced by that method.

We have shown, in our prior Patent No. 2,425,343, that cycloalkyl acetic acids are formed when the corresponding cycloalkyl butyric acids are heated with fused caustic alkalies at and above temperature of 370° C. In order to produce α-substituted acetic acids from acids with longer carbon chains, it was presumed necessary to have a cycloalkyl group on the end or omega carbon atoms of the original acid. We have now found that, while the presence of a cycloalkyl group on the terminal carbon atom of the aliphatic portion af an aliphatic carboxylic acid is sufficient to stop the oxidative scission of such an acid when the α-substituted acetic acid has been produced in a fused alkali, it is not an essential condition. We have now found that any alkyl carboxylic acid having a tertiary carbon atom in the γ-position will yield an α-substituted acetic acid when heated with fused alkali metal hydroxides at or somewhat above 370° C. (preferably 370° to 430° C.) and that, when the acid being treated is a γ-alkyl linear carboxylic acid, such as a γ-alkyl caproic acid, the product obtained is a di-alkyl acetic acid. Thus, we have found that the reaction of γ-tertiarybutyl caproic acid with fused caustic alkalies gives α-ethyl α-tertiarybutyl acetic acid, more properly designated as α-tertiarybutyl butyric acid. Similarly, γ-secondarybutyl caproic acid and -isopropyl caproic acid give the corresponding α-secondarybutyl and α-isopropyl butyric acids. In like manner, such hydrocarbon substituted compounds as γ-ethyl cyclohexanecaproic acid, when fused with caustic alkalies, yield α-ethyl cyclohexanebutyric acid, as the tertiary carbon atom in the γ-position of the original caproic acid derivative effectively halts the degradation of the chain when the carboxyl group moves to the position adjacent that carbon atom.

The preparation of compounds which may be deemed structurally to be di-(hydrocarbon substituted) acetic acids may be illustrated by the following example:

Four parts of γ-tertiarybutyl caproic acid, which had been made by heating 4-tertiarybutyl cyclohexanol with fused potassium hydroxide at 350° C., was added to a fused mixture of 10 parts potassium hydroxide and 2 parts potassium acetate at 370° C. The mixture was stirred continuously and heating was continued for about 4 hours after all of the butyl caproic acid had been introduced. The mixture was cooled, dissolved in water and acidified, and the organic layer was separated from the resulting brine. The principal product was an 8-carbon atom acid, having the analysis $C_8H_{16}O_2$. It forms large crystals when crystallized from acetone, and melts at 76°–77° C. The new acid boils in the range from 105° to 110° C. at 10 millimeters of mercury, absolute pressure. It has a neutralization equivalent of 142.3, and analysis shows 67.4 per cent carbon and 11.2 per cent hydrogen. (Calculated, 66.6% C; 11.2% H; neutralization equivalent 144.2.) The acid has been proven to be α-tertiarybutyl butyric acid by a series of degradation reactions to produce known compounds. Thus, the α-tertiarybutyl butyric acid was converted to 2,2-dimethyl-3-amino pentane, boiling at 125°–127° C., refractive index at 25° C. 1.4182, by reaction with sodium azide and sulfuric acid. The amine was oxidized by alkaline permanganate solution to trimethyl acetic acid, boiling at 163° to 166° at 745 mm. pressure. The latter acid was identified by its amide, melting at 152°–152.5° C., nitrogen content 13.76 per cent, and by its anilide, melting at 133°–134° C. The 2 2-dimethyl-3-amino pentane was further identified by its oxidation with acidic dichromate to 2,2-dimethyl-3-pentanone which gave a known 2,4-dinitrophenylhydrazone melting at 146°–146.5° C. These reactions adequately identify the $C_8H_{16}O_2$ as being α-tertiarybutyl butyric acid.

Further to show the general applicability of the process to the production of hydrocarbon substituted acetic acids from alkyl carboxylic acids having a tertiary carbon atom in the γ-position, γ-ethyl cyclohexanebutyric acid was prepared by the oxidation of 4-cyclohexane cyclohexanol in fused caustic potash at 300° C., and was found to have a boiling point of 172°–176° C. at 10 millimeters; a density (25°/4° C.) of 0.9806; and a refractive index (25°/D) of 1.4707. It formed an amide melting at 99.2°–99.7° C. This γ-ethyl cyclohexanebutyric acid was heated with fused alkali at 370° C. and the principal product was α-ethyl cyclohexaneacetic acid. In similar manner γ-ethyl caproic acid yields α-ethyl butyric acid, and γ-methyl caproic acid yields the corresponding α-methyl butyric acid.

We claim:

1. The method for the production of di-alkyl acetic acids which consists essentially in heating a γ-alkyl saturated linear alkyl carboxylic acid with a fused alkali metal hydroxide at a temperature from 370° to 430° C., and recovering the di-alkyl acetic acid from the reaction mixture.

2. The method for the production of di-alkyl acetic acids which consists essentially in heating a γ-alkyl caproic acid with a fused alkali metal hydroxide at a temperature from 370° to 430° C., and recovering the α-alkyl butyric acid from the reaction mixture.

3. The method for the production of α-tertiarybutyl butyric acid which consists essentially in heating γ-tertiarybutyl caproic acid with a fused alkali metal hydroxide at a temperature from 370° to 430° C., and recovering the α-tertiarybutyl butyric acid from the reaction mixture.

EARL L. PELTON.
ANDREW A. HOLZSCHUH.

REFERENCES CITED

The following references are of record in the file of this patent.

UNITED STATES PATENTS

| Number | Name | Date |
|---|---|---|
| 2,425,343 | Pelton et al. | Aug. 12, 1947 |

OTHER REFERENCES

Richard, Beilstein (Handbuch, 4th ed.), vol. 2, 1st suppl., page 150 (1929).

Guerbet, Beilstein (Handbuch, 4th ed.), vol. 2, 2nd suppl., p. 304 (1942).